United States Patent [19]

Rosenberger

[11] Patent Number: 4,947,151

[45] Date of Patent: Aug. 7, 1990

[54] WHEEL MOUNTED MOTION AND TAMPERING ALARM

[76] Inventor: Jerome C. Rosenberger, 10502 Acacia La., Fairfax, Va. 22032

[21] Appl. No.: 328,304

[22] Filed: Mar. 24, 1989

[51] Int. Cl.$^5$ .............................................. G08B 13/00
[52] U.S. Cl. ................... 340/426; 73/146.4; 180/287; 307/10.2; 340/429; 340/447; 340/539; 342/457
[58] Field of Search ............ 340/426, 429, 428, 425.5, 340/445, 447, 539, 541, 442; 342/457, 450; 307/10.2; 180/287; 73/146.4, 146.5, 146.8

[56] References Cited

U.S. PATENT DOCUMENTS

| | | | |
|---|---|---|---|
| 3,037,575 | 6/1962 | Quinn | 342/457 |
| 3,703,714 | 11/1972 | Andrews | 340/426 |
| 4,040,008 | 8/1977 | Sanabria | 340/429 |
| 4,110,738 | 8/1978 | Sattin | 340/426 |
| 4,177,466 | 12/1979 | Reagan | 340/426 |
| 4,229,620 | 10/1980 | Schaible | 342/457 |
| 4,236,142 | 11/1980 | Lindsey | 340/426 |
| 4,237,728 | 12/1980 | Betts | 73/146.5 |
| 4,429,232 | 1/1984 | Thomas . | |
| 4,510,484 | 4/1985 | Snyder | 73/146.5 |
| 4,531,112 | 7/1985 | Thomas | 73/146.5 |
| 4,592,317 | 6/1986 | Wrobel | 180/287 |
| 4,596,988 | 6/1986 | Wanka | 342/457 |
| 4,665,379 | 5/1987 | Howell | 180/287 |
| 4,714,131 | 12/1987 | Wisegerber | 180/287 |
| 4,740,775 | 4/1988 | Price | 340/429 |
| 4,818,029 | 4/1989 | Mourot et al. | 180/287 |

FOREIGN PATENT DOCUMENTS 2840136  3/1980  Fed. Rep. of Germany ...... 342/457

Primary Examiner—Joseph A. Orsino
Assistant Examiner—Brent A. Swarthout
Attorney, Agent, or Firm—Shlesinger & Myers

[57] ABSTRACT

A tamper-proof motion and tampering alarm for a pneumatic tired vehicle consists of a motion detector, tampering detectors, radio transmitter, and power supply. All of these are mounted inside the pressurized tire of the vehicle. Any unauthorized motion or tampering with the tire will cause the alarm to be activated at a distant remote site by way of radio signal through the dielectric tire.

The control unit consists of a radio receiver, alarm, system interfaces, and power supply. The system can be enabled and securely disenabled by use of prearranged and encrypted radio signals.

20 Claims, 3 Drawing Sheets

WHEEL MOUNTED MOTION AND TAMPERING ALARM

BACKGROUND—FIELD OF INVENTION

This invention relates to vehicle tampering and theft alarm systems, specifically alarms for vehicles with pneumatic tires.

BACKGROUND—DESCRIPTION OF PRIOR ART

A need exists for a tamper-proof theft alarm for motor vehicles. All alarms currently in existence can be disabled by a thief who knows the details of the alarm system. The thief can simply disconnect the power supply or ground the antenna if a remote alarm is utilized. Generally speaking, the public ignores local audible alarms. What is needed is an alarm system that can not be disabled even if the thief has perfect knowledge of the alarm system hardware installation.

A need also exists for an alarm system such that after the vehicle is stolen, will continue to transmit a signal to aid in the rapid localization and recovery of the vehicle. The vehicle could be an automobile, truck, aircraft, farm or industrial equipment.

There is also a need for a device that could be mounted on a crime suspect's vehicle that could be enabled by the authorities to radiate a radio signal covertly to aid in the covert tracking or following of that vehicle.

Early concepts in vehicle theft alarms were designed about the concept of attracting the attention of passersby in some manner if an unauthorized person attempted to tamper with, or enter the vehicle.

U.S. Pat. No. 4,714,131 to Wisegerber (1987) presents a mechanical approach by attaching a mechanism to a wheel of the vehicle that emits a loud clatter when the wheel rotates if the system is not disarmed. U.S. Pat. No. 4,592,317 to Wrobel (1986) describes a typical alarm that flashes the vehicle headlights and sounds the horn to attract attention and, additionally, injects oil into the fuel system to create smoke. Various alarms include some permutation of sensors, (motion sensors, acoustic sensors, vibration sensors, etc.) and alarm devices (horns, sirens, headlights, ignition cutouts, starter motor cutouts, etc.).

A problem with these alarms is that many of them have high false alarm rates. The result is that the public has become desensitized to the sight and sound of an alarming vehicle. Sociological experimenters have dismantled alarming vehicles in public and no one notified the police. A second problem is that these alarms are easy to silence once the vehicle has been entered.

An improvement is represented by U.S. Pat. No. 4,665,379 to Howell et al. (1987) which includes the addition of a radio transmitter which caused a remote pager to alarm. This alerts the owner or driver of the vehicle who can immediately call the police.

These alarms have also been used on trucks that carry valuable cargos worth millions of dollars. The trouble is that a thief, knowing about the alarm, can easily ground the antenna or interrupt the transmitter power supply to silence the alarm. The thief in this case has sufficient incentive to obtain this knowledge in spite of the effort and expense expended in hiding the sensors and antennae.

The invention described herein is an improvement in that the motion and tampering sensors, the radio transmitter, and the power supply are all located within the protective environment of the pneumatic tire. Modern technology has made this practical.

Placing a radio transmitter inside a tire has been done for the purpose of monitoring the inflation pressure of the tire. U.S. Pat. No. 4,237,728 to Betts et al. (1980) presents a low tire warning system for a vehicle with sensors and transmitter located within the tires. U.S. Pat. No. 4,531,112 to Thomas (1985) describes a method and apparatus for transmitting from within a pneumatic wheel assembly.

Other related art concerns the provision of a power supply for pressure monitors placed inside rotating pneumatic tires. U.S. Pat. No. 4,429,232 to Thomas (1984) and U.S. Pat. No. 4,510,484 to Snyder (1985) present such concepts.

Another deficiency in current tampering and theft alarm systems is that once the alarm is silenced, and the vehicle is moved, the alarm is of no use in relocating the stolen vehicle.

A further deficiency in current vehicle tampering and theft alarm systems is that their installation requires a modification of the vehicle electrical system. Modern vehicle electrical systems are quite complex and often these installations, aside from being very expensive, cause problems with the factory installed systems.

Finally, these systems are very expensive to install because attempts must be made to hide the sensors and wires from the thief in an often futile attempt to render these systems tamper proof. Most accomplished thieves have mastered these systems and the installation tricks.

OBJECTS AND ADVANTAGES

It is an object of this invention to provide a tamper-proof motion/tampering alarm for a wide range of vehicles with pneumatic tires.

It is a further object of this invention to provide a theft alarm which will continue to sound on a stolen vehicle, unknown to the thief, which will aid authorities in tracking and recovering the vehicle.

It is yet a further object of this invention to provide a system that could be easily installed on a crime suspect's vehicle covertly to aid the authorities in tracking the vehicle while in motion.

Specific advantages of this invention are:

1. It does not rely upon the public to take action.
2. Even if the thief has perfect knowledge of the hardware installation, he cannot disable the alarm without actuating it.
3. The owner or driver is alerted and will take action.
4. The alarm is locally silent so that the thief does not realize that he or she is discovered.
5. The signal will continue to radiate while the vehicle is being driven to aid authorities in relocating the vehicle possibly utilizing a cellular telephone or satellite system to receive the signal.
6. The installation is very quick and inexpensive compared to existing systems.
7. The installation does not require any modification to the vehicle electrical system.
8. The invention could be covertly installed on a crime suspect's vehicle and the signal used by the authorities to track the vehicle while moving from a secure distance.
9. Reliability can be achieved by installing multiple vehicle units in the various pneumatic tires of a vehicle.

DESCRIPTION OF THE PREFERRED EMBODIMENT

Figure 1:
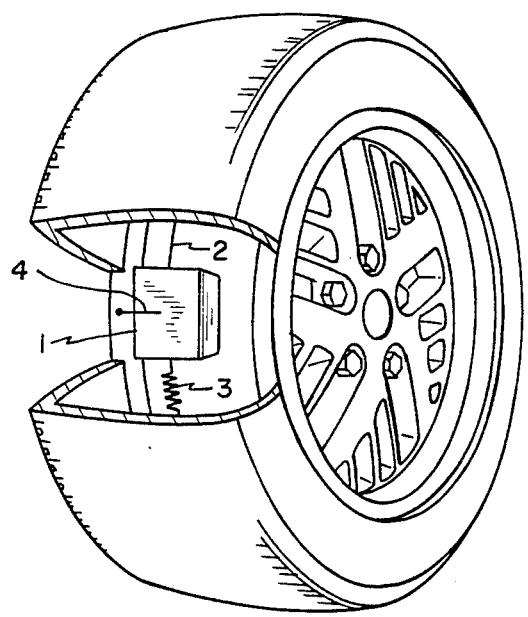
FIG. 1 Is a cutaway quarter view of a pneumatic tire of a vehicle showing the vehicle unit of the wheel mounted motion/tampering alarm held to the center hub by a tensioned wire. Visible on the vehicle unit is the antenna.

FIG. 1 illustrates how the vehicle unit 1 of the wheel mounted motion/tampering alarm can be held to the hub of a wheel on a pneumatic tired vehicle. A wire 2 tensioned with a spring 3 holds the unit securely even at high wheel speeds. A counter weight (not shown) is located diametrically opposite to maintain wheel balance. The antenna 4, when transmitting, will radiate an omni-directional radiation pattern as the wheel rotates.

Figure 2:
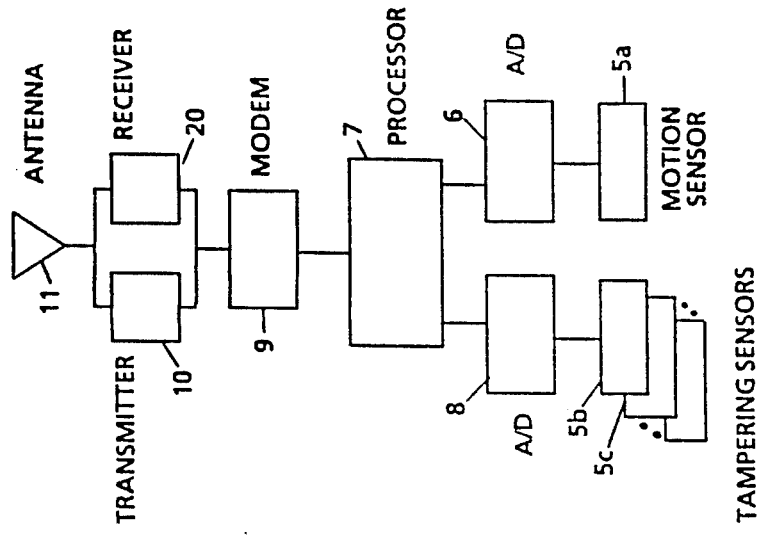
FIG. 2 is a functional diagram of a vehicle unit according to the present invention.

FIG. 2 shows the major functional components of the vehicle unit. A motion sensor 5a will detect any motion caused by wheel rotation or wheel removal. The analog electrical signal from the motion sensor is digitized by an analog to digital converter (A/D) 6 and sent to the vehicle digital processor 7.

Tampering sensors 5b, 5c, . . . sense the environment of the pneumatic tire by sensing internal pressure, vibration, etc., and sends the analog signals to an analog-to-digital converter (A/D) 8. The digital tampering signal is then sent to the processor 7.

The processor determines with a computer program whether conditions warrant sounding an alarm in terms of signal strength and duration. If an alarm is to be sounded, a signal is sent through a modem 9 to the transmitter 10 which then radiates the alarm signal from the antenna 11.

In one of the preferred embodiments, the signal is received on the antenna 12 of the control unit at a remote location. This antenna is connected to a receiver 13. The receiver sends the alarm to the processor 14 of the control unit through a modem 15. The processor causes an audible alarm 16 to sound through a digital-to-analog (D/A) converter 17.

DESCRIPTION—ENABLING

The system could operate in two basic modes; ENABLED, and DISENABLED. When the system is DISENABLED, a code, known only to the operator, can be entered into the keypad 18 of the control unit. This code is thereby entered into both the units via the radio link. Once a code is entered, the system can be enabled for alarm conditions. The operator actuates the ENABLE key on the keypad and enters the proper authenticating code. This signal sent through the transmitter 19 to the vehicle unit where it is received by the receiver 20 of the vehicle unit. The code is recognized and the vehicle unit is thereby ENABLED. A confirmation signal is sent back to the control unit and is displayed on the display 21. This verifies to the operator that the unit is ENABLED, the batteries are charged, and any subsequent alarm signal will be recognized.

When the operator returns to the vehicle, the unit must be DISENABLED. To accomplish this, the operator actuates the DISENABLE key on the keypad 18 and reenters the authentication code. In this case, the signal could be encrypted before it is sent to the vehicle unit with a unique keylist that exists permanently in the memory of both the control unit and vehicle unit processors. Thus, each time, the encrypted signal could change thus preventing a thief from intercepting the DISENABLE radio signal and reusing it. When the unit is thus DISENABLED, a confirmation signal could be sent back to the control unit and displayed on the display 21.

DESCRIPTION—VEHICLE UNIT POWER

The control unit could be powered by a battery that is rechargeable. The charging voltage would be appropriate to the application.

Figure 3:
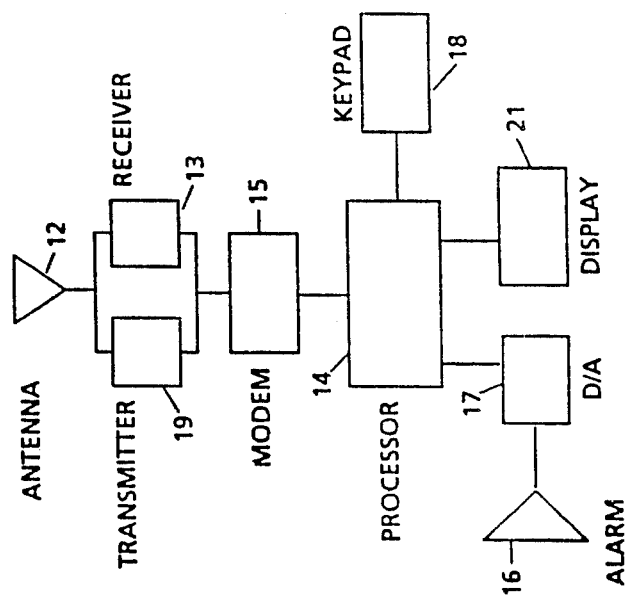
FIG. 3 is a functional diagram of a control unit according to the present invention.
Figure 4:
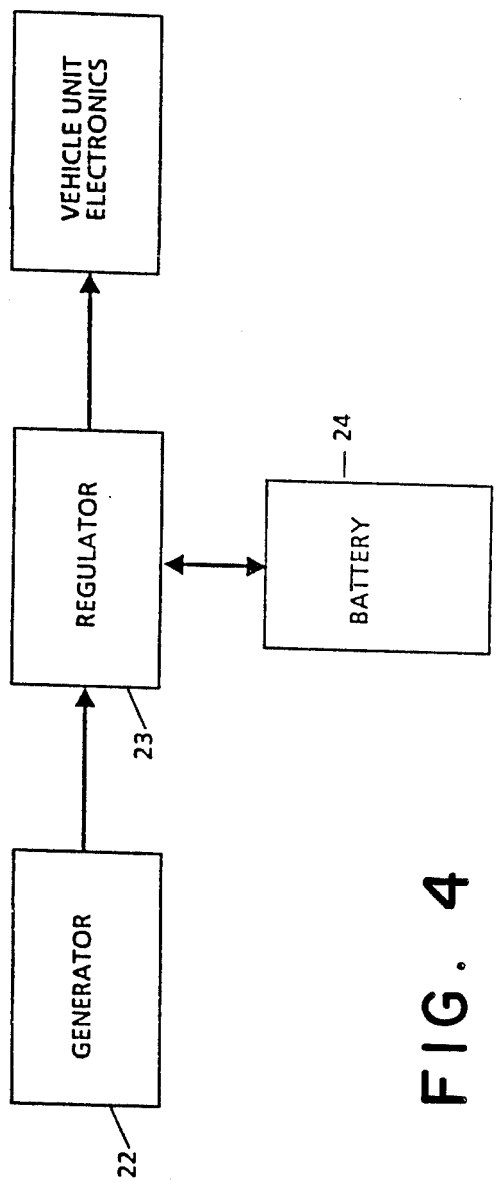
FIG. 4 is a functional diagram of the power supply sub-system for the vehicle unit inside the pneumatic tire.

FIG. 3 shows the power system for the vehicle unit in the preferred embodiment. When the system is DISENABLED, and the vehicle is moving, the vehicle unit moves in a cycloidal path. This motion could be used to generate electrical power in a generator 22 employing a moving permanent magnet and a coil. This electrical power could be rectified and regulated in a regulator 23 to charge a rechargeable battery 24 in the vehicle unit.

DESCRIPTION—SYSTEM INTERFACES

The wheel mounted motion/tampering alarm can be interconnected by radio signal to a variety of other systems in the preferred embodiment. A radio receiver can be used to connect the system to any other alarm system including automatic telephone dialers. The radio signal from the vehicle unit can be designed to be received by a cellular telephone system or a satellite navigation system for stolen vehicle localization.

DESCRIPTION—SUMMARY

The essential novel concept of this invention is to utilize the protected environment inside a pneumatic tire of the vehicle for housing the motion sensor, tampering sensors, radio transmitter, antenna, and power supply to keep them safe from a potential thief. By locating these units inside the tire, the thief is denied access to them. The unit will alarm to a remote receiver if the tire is either tampered with, or moved. The unit can be enabled or securely disenabled by coded signals that only the owner knows.

The wheel mounted system can be designed to continue to alarm while the stolen vehicle is moving to enable the authorities to locate the vehicle and recover it. The alarm can be interfaced to any other alarm systems. Additionally, the alarm signal can be designed to be compatible with a cellular telephone system or a satellite navigation system to aid in localization.

Finally, this device could be utilized by police authorities and mounted covertly on a crime suspect's vehicle to aid in tracking the suspect without approaching closely. The unit could be enabled and disenabled by the police to prevent discovery by a radio frequency scanner in the hands of the suspect.

The vehicle unit could be powered by a rechargeable battery that could be charged by a generator located in the wheel unit and using the wheel motion for energy.

The system could be designed so that the owner could change the codes if necessary. The disenabling signal could be encrypted to prevent a thief from intercepting the code and using it later.

Accordingly, it is claimed:

1. A tampering and theft alarm system for a vehicle having at least a pneumatic tire, said system comprising:
   (a) a vehicle unit mounted within a pneumatic tire of a vehicle and including means for detecting an unauthorized movement of the vehicle and generating an alarm signal in response to the unauthorized movement of the vehicle, a first transmitter for transmitting the alarm signal, a first receiver for receiving an enabling or disenabling signal, means responsive to the enabling or disenabling signal for enabling or disenabling, respectively, said detecting means, and a first power source operably connected to said detecting means, said first transmitter, said first receiver and said enabling or disenabling means;
   (b) a control unit remote from the vehicle and including a second receiver for receiving the alarm signal from said first transmitter, alarm means operably connected to said second receiver for being responsive to the received alarm signal, a second transmitter for transmitting the enabling or disenabling signal to said vehicle unit, and a second power source operably connected to said second receiver, said alarm means, and said second transmitter;
   (c) whereby when the detecting means is enabled by the enabling signal from said control unit and when said detecting means detects unauthorized movement of the vehicle, said vehicle unit transmits an alarm signal to said control unit thereby activating said alarm means and warning a person in the vicinity of said control unit of the unauthorized movement of the vehicle.

2. A system as in claim 1, wherein:
   (a) said detecting means includes a motion sensor.

3. A system as in claim 1, wherein:
   (a) said detecting means includes a vibration sensor.

4. A system as in claim 1, wherein:
   (a) said detecting means includes an internal pressure sensor.

5. A system as in claim 1 wherein:
   (a) said detecting means includes a motion sensor and a plurality of vibration and internal pressure sensors.

6. A system as in claim 1, wherein:
   (a) said enabling and disenabling means includes a processor.

7. A system as in claim 1, wherein:
   (a) said vehicle unit includes means for informing a user when said detecting means is enabled or disenabled.

8. A system as in claim 1 wherein:
   (a) said control unit includes means for encrypting the disenabling signal; and
   (b) said vehicle unit includes means for deciphering the encrypted disenabling signal.

9. A system as in claim 1, wherein:
   (a) said first power source includes a rechargeable battery.

10. A system as in claim 9, wherein:
    (a) said first power source includes a generator for charging said battery.

11. A system as in claim 1, wherein:
    (a) said alarm means includes an audible alarm.

12. A tampering and theft alarm system for a vehicle having at least a pneumatic tire, said system comprising:
    (a) at least one alarm sensor disposed within a pneumatic tire of a vehicle for detecting an unauthorized movement of the vehicle and for generating an alarm signal in response to the unauthorized movement of the vehicle;
    (b) a first processor disposed within the tire and operably connected to said at least one alarm sensor for enabling or disenabling said alarm sensor in response to an enabling or disenabling signal, respectively;
    (c) a first transmitter disposed within the tire and operably connected to said first processor for transmitting the alarm signal when said first processor determines that the alarm sensor is enabled;
    (d) a first receiver disposed within the tire and operably connected to said first processor for receiving the enabling or disenabling signal;
    (e) a rechargeable battery disposed within the tire and operably connected to said at least one alarm sensor, said first transmitter, said first receiver and said first processor;
    (f) a control unit remote from the vehicle and including a second receiver for receiving the alarm signal from said first transmitter, an alarm operably connected to said second receiver and responsive to the received alarm signal, a second processor for generating the enabling or disenabling signal, a second transmitter for transmitting the enabling or disenabling signal to said first receiver, and a power source operably connected to said second receiver, said alarm, said second transmitter, and said second processor;
    (g) whereby when said at least one alarm sensor is enabled by the enabling signal from said control unit and when said alarm sensor senses the unauthorized movement of the vehicle, said first transmitter transmits an alarm signal to said control unit, thereby activating said alarm and warning a person in the vicinity of said control unit of the movement of the vehicle.

13. A system as in claim 12, wherein:
    (a) said at least one alarm sensor includes a motion sensor.

14. A system as in claim 12, wherein:
    (a) said at least one alarm sensor includes a vibration sensor.

15. A system as in claim 12, wherein:
    (a) said at least one alarm sensor includes an internal pressure sensor.

16. A system as in claim 12, and including:
    (a) a plurality of said at least one alarm sensor including a motion sensor and a plurality of vibration and internal pressure sensors.

17. A system as in claim 12, wherein:
    (a) said second processor includes means for encrypting the disenabling signal; and
    (b) said first processor includes means for deciphering the encrypted disenabling signal.

18. A system as in claim 12, and including:
    (a) a counterweight disposed within the tire for balancing the tire.

19. A system as in claim 12, and including:
    (a) a generator for charging said battery.

20. A system as in claim 12, wherein:
    (a) said alarm includes an audible alarm.

* * * * *